Oct. 30, 1928.  S. KENNEDY, JR  1,689,243
CULTIVATOR
Filed March 14, 1925    4 Sheets-Sheet 3

Inventor
SAMUEL KENNEDY, JR.
By Paul, Paul & Moore
Attorneys

Oct. 30, 1928.
S. KENNEDY, JR
1,689,243
CULTIVATOR
Filed March 14, 1925　　4 Sheets-Sheet　4
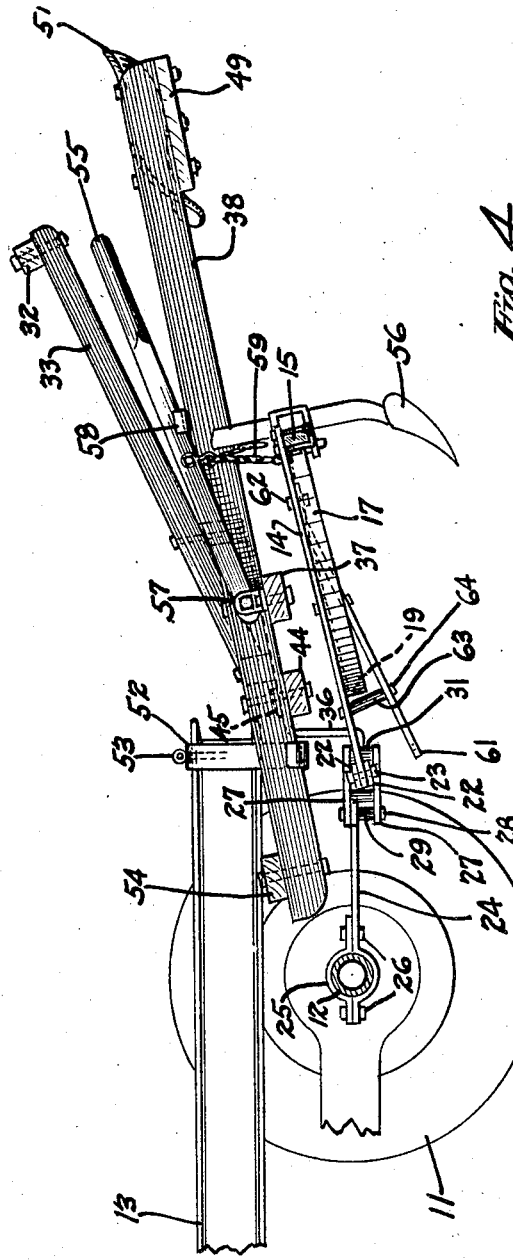
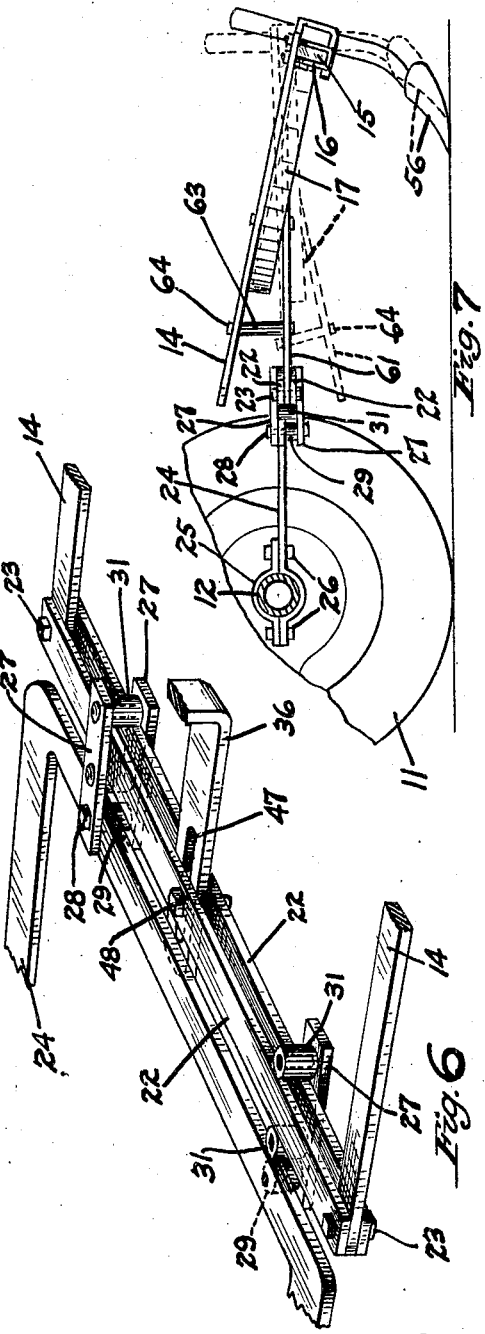
Inventor
SAMUEL KENNEDY, JR.
By
Attorneys Patented Oct. 30, 1928.

1,689,243

UNITED STATES PATENT OFFICE.

SAMUEL KENNEDY, JR., OF CLEAR LAKE, IOWA.

CULTIVATOR.

Application filed March 14, 1925. Serial No. 15,650.

This invention relates to new and useful improvements in cultivators or like implements, and more particularly relates to an apparatus which is adapted to be detachably mounted upon the rear end-portion of an automobile or truck chassis frame as an attachment for cultivating commercial truck crops such as onions, carrots, sugar beets, cabbages and all other field crops, the tops of which may be cleared without injury by the auto axle.

It is well known to those familiar with the growing and cultivation of commercial truck crops and sugar beets, that the use of horse-drawn cultivators for cultivating and working the soil between the plants is not satisfactory, as a result of the usual difficulty encountered in preventing the tools of the cultivator from injuring and sometimes uprooting the plants, caused by the swinging or lateral movement imparted to the tool-supporting bar of the cultivator, by the movement of the horses. It is therefore desirable that means be provided whereby the cultivator tools may be accurately guided between the rows of plants so that close cultivation may be accomplished without the usual danger of injuring the plants. Another disadvantage in the use of horse drawn cultivators resides in the slow movement of the animals, and also in the extreme care which must be exercised when turning at ends in order to prevent the animals from trampling upon the plants.

The novel cultivator or attachment featured in this invention is particularly well adapted for use in cultivating commercial truck crops and plants. Its construction is such that it may readily be attached to the rear end-portion of an automobile or small farm truck. The tool-supporting bar is so arranged and supported that it may readily and conveniently be shifted laterally from side to side by an operator, while the cultivator is in motion, without oscillating on a vertical axis. Each end of the tool bar is also provided with means for lifting it so that the tools may be lifted out of contact with the soil, thereby providing a cultivator which may be accurately guided between the rows or plants by an operator or rider positioned thereon.

An added advantage in the use of this novel apparatus is that it may readily be used for blind cultivating without the usual danger of injuring the seeds or concealed plants. When thus used the seeds are preferably planted by a drill or gang of drills drawn by an automobile or truck and accurately spaced between the wheel tracks of the truck. The wheel tracks of the truck are usually of sufficient depth to be clearly visible when cultivation of the soil is started so that the truck drawing the cultivator may readily be guided over the same tracks with the result that the cultivator tools will not interfere or damage the concealed seeds.

The particular object of this invention, therefore, is to provide an improved cultivator attachment for automobiles or trucks.

Other objects of the invention will appear from the following description and the accompanying drawings and will be pointed out in the annexed claims.

In the drawings, there has been disclosed a structure designed to carry out the various objects of the invention, but it is to be understood that the invention is not confined to the exact features shown as various changes may be made within the scope of the claims which follow.

In the accompanying drawings forming part of this specification,

Figure 4 is a similar view showing the tool bar in inoperative position;

Figure 6 is a perspective view of the movable connection between the draw bar and the tool bar frame; and Figure 7 is a detail view showing the means provided for adjusting the upright position of the tool bar.

Figure 1:
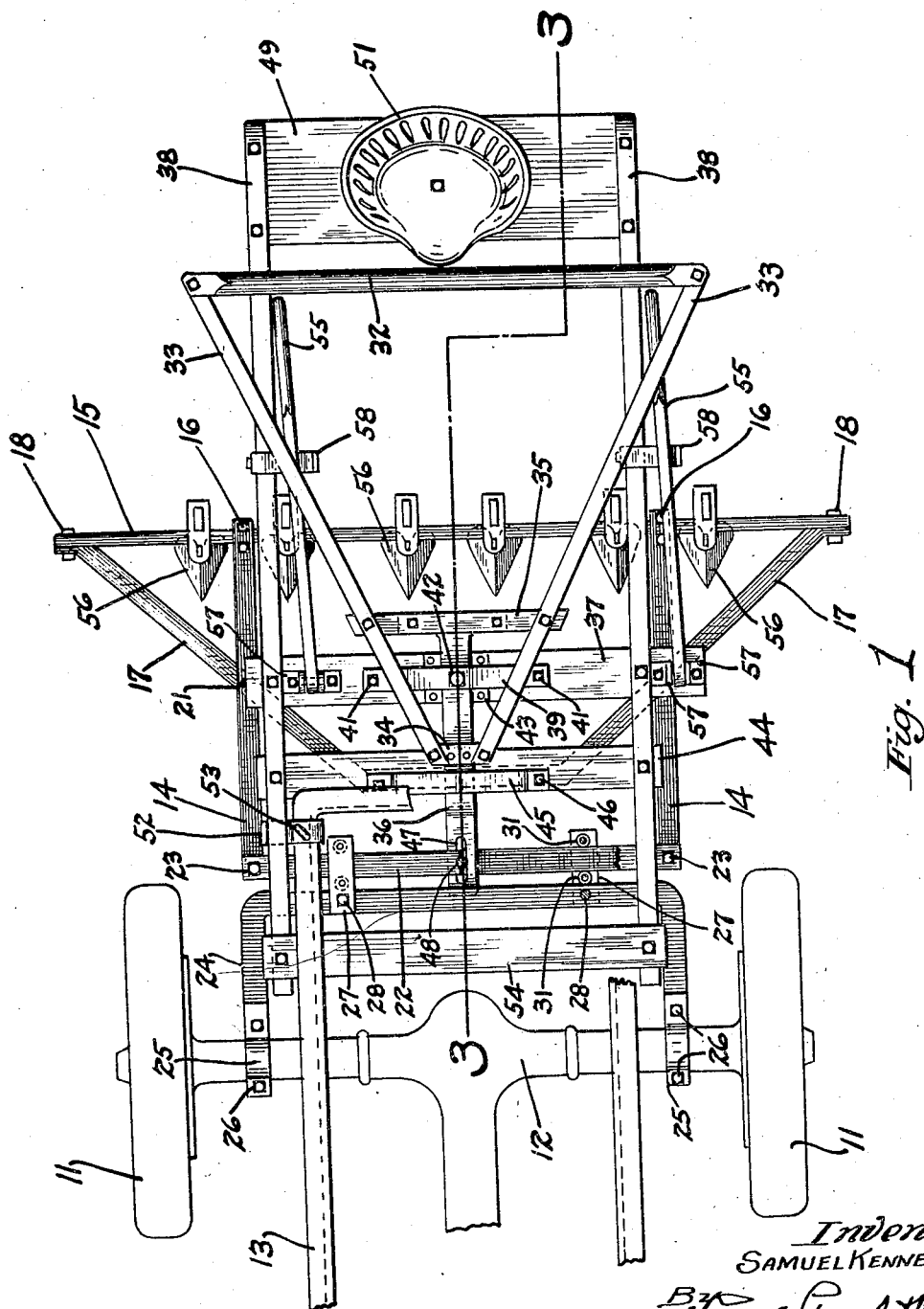
Figure 1 is a plan view of my improved cultivator mounted upon the rear end portion of a truck or automobile.

In the selected embodiment of the invention here shown there is illustrated, for purposes of disclosure, the rear end-portion of an automobile or truck comprising the usual wheels 11, rear axle housing 12 and the chassis frame 13.

The novel structure or cultivator featured in this invention preferably comprises a rectangular frame composed of the opposed side bars 14 having their rear end portions suitably secured to a transverse tool bar 15 by such means as the U-shaped bolts 16. The frame bars 14 are preferably retained in substantially true parallel relation by means of diagonal bracing members 17 having their outer rear end-portions secured to the tool bar by bolts 18 and their forward ends suitably connected together by means of a transverse portion 19 as shown in dotted lines in Figure 1 and full lines Figure 3. The diagonal bracing members 17 and also the transverse portion 19 thereof may be integrally formed, as shown, and are preferably of right-angle cross-section as particularly shown in Figure 3. The frame members 14 are secured to the diagonal braces 17 by bolts 21, see Figure 2, and have their forward ends connected together by means of a pair of spaced parallel bars 22 which are bolted thereto by bolts 23. The bars 22 form the forward rail of the tool or cultivator frame.

The cultivator frame, consisting of the tool bar 15, the two opposed frame members 14, diagonal braces 17 and the two spaced bars 22, is detachably and slidably connected to the rear end-portion of the automobile or truck by means of a U-shaped draft member 24 having its forward ends securely clamped to the axle housing 12 by means of clamps 25 and bolts 26. The connecting means between the draft bar and the forward end of the cultivator frame is clearly shown in Figure 6. As here shown, a pair of short plates or bars 27 are provided on each side of the U-shaped draft bar and are suitably secured thereto by means of bolts 28. Spacing blocks or collars 29 are provided between the lower face of the draft bar and the upper faces of the lower plates 27 to space the latter apart to provide clearance for the spaced parallel bars 22 of the front end of the cultivator frame. Anti-friction rollers 31 are provided between the plates 27 to provide bearing surfaces for the spaced bars 22 so that they may readily be shifted from side to side as will subsequently be described.

Figure 2:
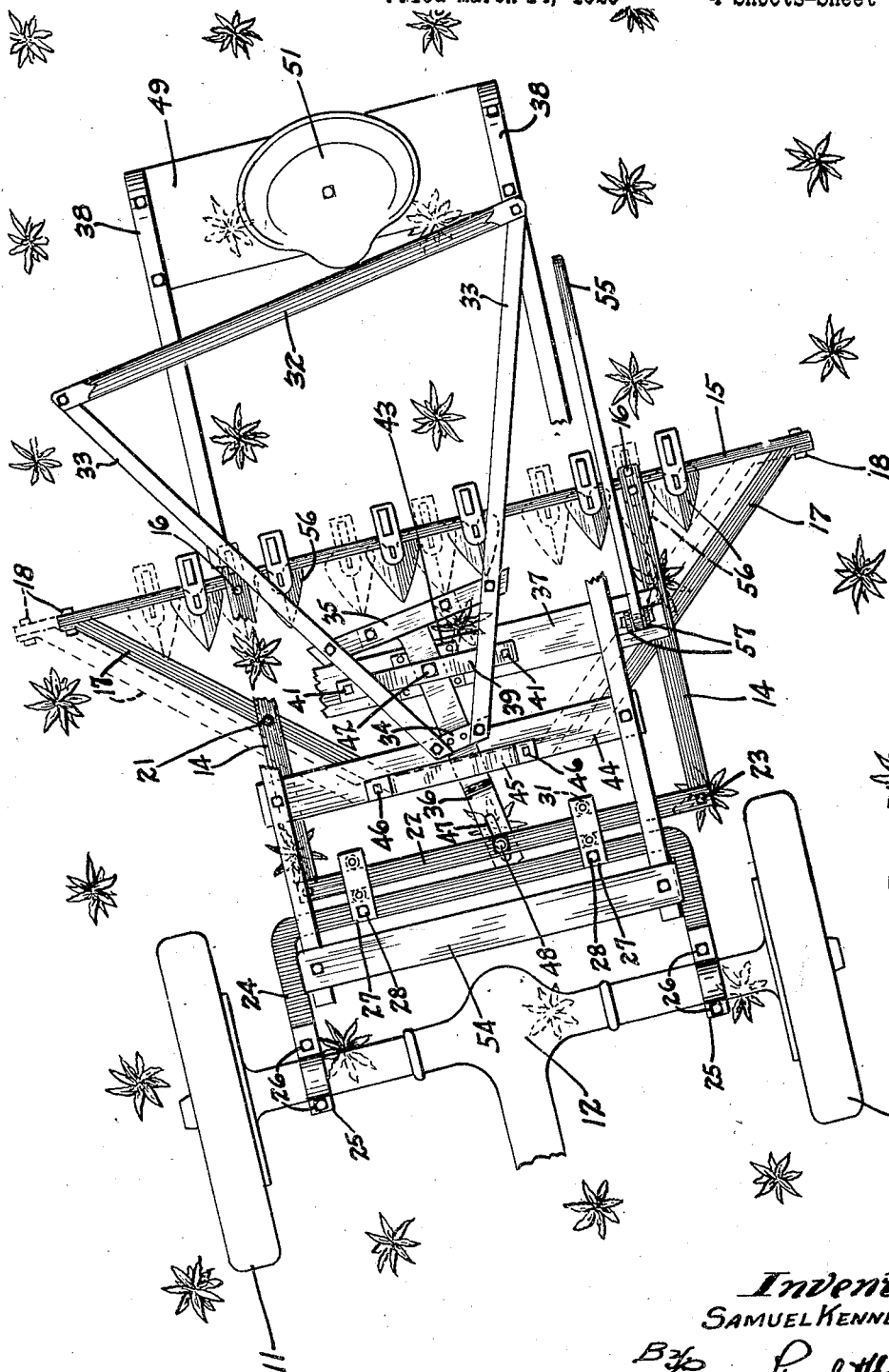
Figure 2 is a similar view showing how the tool bar may be laterally shifted from side to side to clear the plants.
Figure 3:
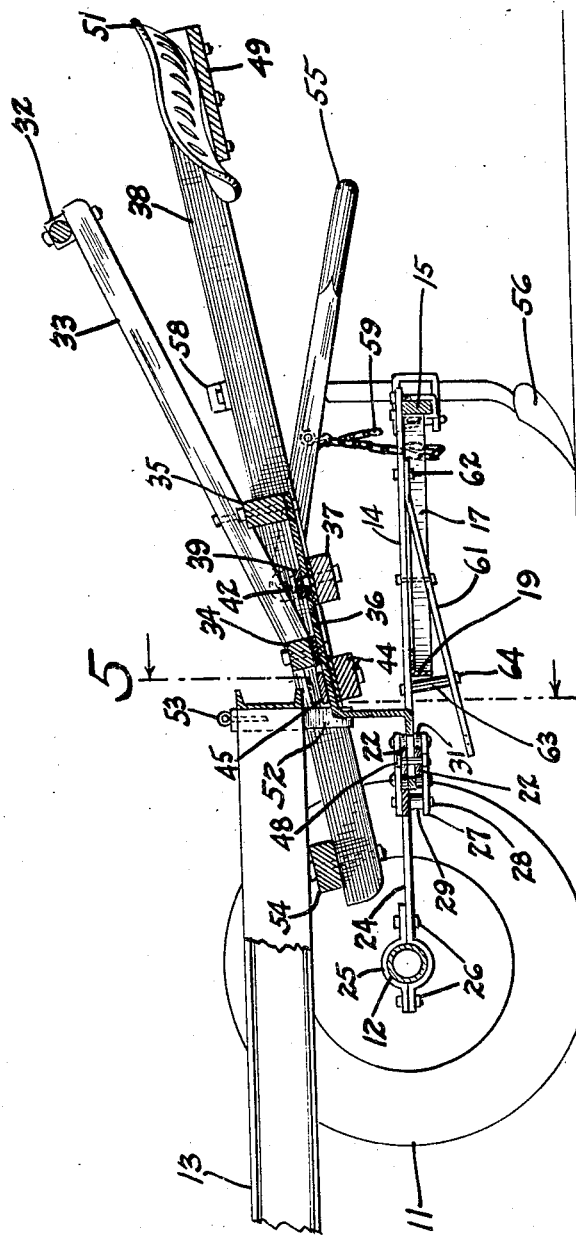
Figure 3 is a vertical sectional view on the line 3—3 of Figure 1 showing the tool bar in operative position.

A feature of this invention resides in the novel means provided for laterally shifting from side to side the cultivator frame and therefore the tools mounted thereon as shown in full and dotted lines in Figure 2. Such means preferably consists of a guide bar 32 mounted upon a pair of diverging arms 33 having their lower ends suitably secured together by means of cross members 34 and 35 as shown in Figures 1, 2 and 3. A Z-shaped guide member or bar 36 is secured to the cross members 34 and 35 of the arms 33, thereby forming a part of the triangular frame supporting the guide bar 32. The Z-shaped member 36 is pivotally mounted upon a transverse bar 37 which is supported by a pair of side beams 38 having their forward ends adapted to be demountably connected to the rear end portion of the truck frame as shown particularly in Figures 1, 3 and 4. A metallic strap 39 is preferably mounted over the Z-shaped member 36 and has its ends secured to the transverse bar 37 by means of bolts 41. A pivot bolt 42 passes through the bar 39, Z-shaped member 36, through a wearing plate 43 and also through the transverse member 37 to provide the pivotal connection between the diverging arms 33 and the cross bar 37. A similar transverse bar 44 is also secured to the side beams 38 and functions to provide a guide for the Z-shaped member 36 which passes thereover as shown in Figure 3. A strap 45 is mounted over the Z-shaped member 36 and has its ends secured to the bar 44 by bolts 46, thereby providing an elongated guide opening for guiding the forward end of the Z-shaped member and therefore providing means for retaining the arms 33 and the guide bar 32 in their proper operative positions.

The forward end of the Z-shaped member 36 is preferably downwardly and forwardly bent as shown in Figures 3 and 4 so that it may be inserted in the space provided between the two spaced bars 22 at the forward end of the cultivator frame. An elongated opening or slot 47 is provided adjacent the forward end of the member 36 adapted to receive a bolt or pin 48 which is demountably seated in apertures provided in the spaced bars 22. By thus pivotally mounting the Z-shaped member 36 on the relatively stationary frame composed of the side beams 38, the operator may conveniently shift the tool bar or cultivator frame bodily from side to side by simply oscillating the diverging arms 33 upon the pivot pin 42 without, however, swinging the frame on a vertical axis. A plate 49 is preferably secured to the rear end portions of the side beams 38 to provide means for supporting an operator's seat 51 as clearly shown in Figures 1, 2, 3 and 4.

Figure 5:
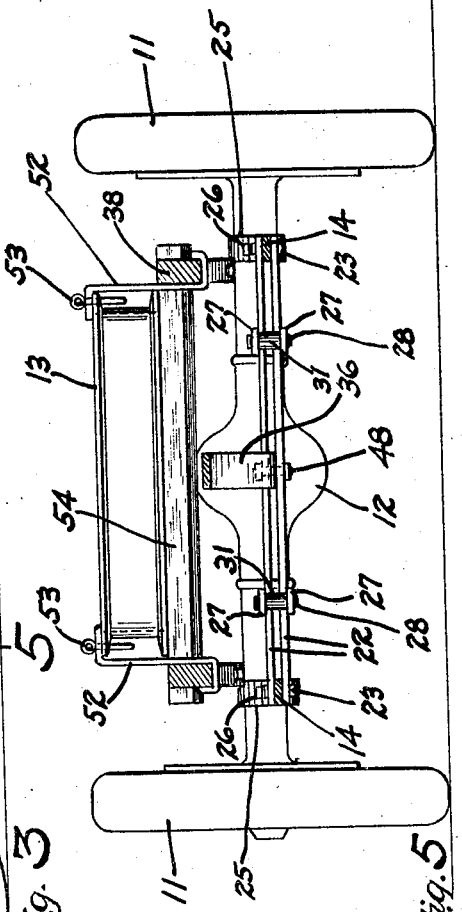
Figure 5 is a cross sectional view on the line 5—5 of Figure 3 showing the means provided for detachably connecting the cultivator supporting frame to the truck frame.

Another feature of this invention resides in the novel means provided for detachably securing the operator's supporting frame to the rear end-portion of the truck frame. Such means preferably consists of a pair of Z-shaped hooks or supporting members 52 having their lower ends adapted to receive and support the side beams 38 and their upper end portions adapted to engage the upper faces of the side frames of the truck thereby providing a substantial supporting means for the beams 38. Eye-bolts or pins 53 are preferably inserted in apertures provided in the upper ends of the Z-shaped members 52 and also in the upper horizontal web of the side beams of the truck frame, see Figure 5. A cross bar 54 is secured to the forward ends of the side beams 38 adapted to engage the bottom of the truck as is clearly shown in Figures 3 and 4. By this novel method of mounting the operator's supporting frame upon the rear end of the truck, it will readily be seen that it may be conveniently detached therefrom by simply lifting the eye-bolts out of their respective sockets and backwardly sliding the hooks 52 out of engagement with the truck frame.

A lifting lever 55 is preferably provided on each side of the operator's frame to provide means for lifting the tool bar or cultivator frame so that the ground-working tools 56 mounted thereon may be lifted out of engagement with the soil. These levers may be pivotally mounted on the transverse bar 37 by means of angle brackets 57. Brackets 58 are provided adjacent the other ends of the levers to retain them in their inoperative positions as shown in Figure 4. Each lever is preferably connected to the tool bar by means of a flexible chain 59. The lifting levers are preferably arranged as shown in Figure 1 wherein one is shown mounted on the inside of the frame while the one on the opposite side is mounted on the outside of the frame. The purpose of thus mounting the levers is to render it more convenient for the operator to lift the tools out of engagement with the soil as both levers may be swung in the same direction over the supporting hooks or brackets 58, whereas if they were both mounted on the inside of the frame or on the outside thereof they would have to be swung in opposite directions to clear the supporting hooks 58 in lowering and raising the tool bar.

Means are preferably provided on the cultivator frame whereby the upright position of the ground-working tools mounted on the tool bar may be adjusted relative to the surface of the ground to cause the tools to dig in more or less as desired. Such means preferably consists in providing an additional diverging frame member 61 beneath each side frame or member 14. These lower frame members 61 have their rear end portions secured to the upper frame members 14 by means of bolts 62. The forward ends of the lower frame members are spaced from the upper frame members by means of spacing collars 63 mounted upon suitable tie bolts 64. By thus spacing the forward ends of the lower frame member 61 from the upper frame members 14, it will readily be seen that when the bolts 23 connecting the upper frame members to the spaced parallel bars 22 are removed and the lower frame members mounted therebetween as shown in Figure 7 that the upright position of the tools 56 will be relatively changed so as to cause the tools to dig deeper into the soil. When the upper frame members 14 are connected to the spaced bar 22 as shown in Figure 3, the tools will not dig so deeply into the soil.

In the operation of this novel cultivator attachment in conjunction with an ordinary automobile or truck, an operator will be positioned upon the seat 51 above the cultivator frame. The truck or automobile will then be guided along between the rows by a driver or operator seated on the truck. By means of the guidebar 32, the operator seated on the cultivator may conveniently guide the tools between the rows of plants without any danger of contacting therewith. The connection between the cultivator frame and the U-shaped draft bar is of such construction that the tool bar and cultivator frame may readily and quickly be shifted from side to side with very little effort. In detaching the cultivator from the truck, the pin or bolt 48 connecting the guide member 36 to the forward end of the cultivator frame, is first removed after which the eye-bolts or pins 53 are removed from the Z-shaped hook members 52. The operator's supporting or riding frame may then readily be removed from the rear end of the truck, it being understood, of course, that the chains 59 must also first be disconnected from the lifting levers 55. After the upper frame structure has thus been removed from the truck frame, the cultivator frame may readily be removed by simply removing the two bolts 28 from the U-shaped draft bar, after which the entire apparatus will be detached from the truck. If desired, the U-shaped draft bar may be left permanently connected to the rear axle housing of the truck.

I claim as my invention:

1. The combination with a draft yoke, of a tool frame having a forward rail, and a tool bar and ground-working tools carried thereby, side bars connecting said tool bar with said rail, said side bars comprising diverging upper and lower members, said upper members when connected to said rail holding the tools of such tool bar at a certain angle to the ground line and the other side bars when connected to said rail holding said tools at a different angle to the ground line.

2. The combination with a draft yoke, of a tool frame comprising a bar wherein ground-working tools are mounted, a forward rail having means for connection with said draft yoke and held thereby against oscillation on a vertical axis and means connecting said tool bar with said rail and adapted for adjustment to tilt said tool bar and change the angle of the tools with respect to the ground line.

3. A ground-working device comprising a riding frame adapted for connection with the rear of a vehicle in overhanging relation to the ground, a tool frame and ground-working tools mounted below said frame, said tool frame below the riding frame having draft connections permitting its transverse movement with respect to the vehicle, a riding frame, a Z-bar pivoted in said riding frame and having pivotal connection at one end with said tool frame, and a lever device mounted on said riding frame and connected with said Z-bar for oscillating it to shift said tool-carrying frame.

4. A ground-working implement comprising a frame having means for connecting it with the rear axle of a vehicle, ground-working tools mounted in said frame, a riding frame having means for temporarily mounting at the rear of the vehicle frame, in projecting overhanging relation to the ground and means pivotally mounted on said riding frame and pivotally connected with said tool-carrying frame for shifting it laterally with respect to the vehicle.

5. A ground-working device comprising a tool frame having a draft means adapted for connection to the rear axle of a vehicle, and arranged for lateral reciprocating movement but held against oscillation on a vertical axis, a riding frame having means for temporary connection to the rear of the vehicle, and means mounted on said riding frame and connected with said tool frame for shifting the same linearly from side to side.

6. A ground working device comprising a riding frame having means for connection with the rear of a vehicle chassis to project therebehind above the ground, a ground working tool frame below the riding frame, said tool frame having attachable draft connections permitting lateral sliding movement thereof and lever means mounted in said riding frame and connected with the tool frame for laterally shifting the same.

7. A combination with a vehicle including a chassis, a riding frame having side rails connected by terminal cross members, one of the cross members of the frame engaged beneath the chassis, fulcrum hangers on said chassis engaging beneath the side rails of the riding frame rearwardly of its engagement with said chassis, said frame disposed in overhanging relation to the ground, a ground working tool carrying frame beneath said riding frame translatable crosswise thereof and connections between the riding frame and tool frame including an open frame-like operating lever for translating the tool carrying frame, and operable from the rear of the riding frame.

In witness whereof, I have hereunto set my hand this 10 day of March, 1925.

SAMUEL KENNEDY, Jr.